(12) United States Patent
Tamura et al.

(10) Patent No.: US 11,523,089 B2
(45) Date of Patent: Dec. 6, 2022

(54) SURVEILLANCE CAMERA SYSTEM AND SURVEILLANCE CAMERA SETTING METHOD

(71) Applicant: PANASONIC I-PRO SENSING SOLUTIONS CO., LTD., Fukuoka (JP)

(72) Inventors: Toru Tamura, Fukuoka (JP); Ryutaro Sen, Fukuoka (JP); Akito Omata, Fukuoka (JP); Michinori Kishimoto, Fukuoka (JP); Akihiro Nawata, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 0 days.

(21) Appl. No.: 17/369,248

(22) Filed: Jul. 7, 2021

(65) Prior Publication Data

US 2022/0014715 A1    Jan. 13, 2022

(30) Foreign Application Priority Data

Jul. 8, 2020  (JP) .............................. JP2020-117978

(51) Int. Cl.
*H04N 7/18* (2006.01)
*H04N 5/232* (2006.01)
*H04N 5/247* (2006.01)

(52) U.S. Cl.
CPC ......... *H04N 7/181* (2013.01); *H04N 5/23212* (2013.01); *H04N 5/23296* (2013.01); *H04N 5/23299* (2018.08); *H04N 5/247* (2013.01)

(58) Field of Classification Search
CPC ............... H04N 7/181; H04N 5/23212; H04N 5/23296; H04N 5/23299; H04N 5/247;
(Continued)

(56) References Cited

U.S. PATENT DOCUMENTS

2015/0138311 A1* 5/2015 Towndrow ........... H04N 5/2251
348/36
2015/0341569 A1* 11/2015 Takita ................... H04N 5/268
348/705

(Continued)

FOREIGN PATENT DOCUMENTS

JP          2019-220831        12/2019

*Primary Examiner* — Gevell V Selby
(74) *Attorney, Agent, or Firm* — Greenblum & Bernstein, P.L.C.

(57) ABSTRACT

A surveillance camera system includes a surveillance camera having a plurality of cameras for capturing images in a plurality of different image capturing ranges, and a terminal device capable of communicating with the surveillance camera. The terminal device transmits to the surveillance camera arrangement pattern information and image capturing range information of the plurality of cameras that are input by an operation of a user. The surveillance camera calculates camera parameters of the plurality of cameras based on the arrangement pattern information and the image capturing range information of the plurality of cameras transmitted from the terminal device, respectively set the plurality of cameras based on the camera parameters, and transmits to the terminal device images respectively captured by the plurality of cameras after the setting. The terminal device displays the images captured by the plurality of cameras and transmitted from the surveillance camera.

8 Claims, 14 Drawing Sheets

(58) Field of Classification Search
CPC ........... H04N 5/23206; H04N 5/23216; H04N 5/23238
See application file for complete search history.

(56) References Cited

U.S. PATENT DOCUMENTS

| | | | |
|---|---|---|---|
| 2016/0057355 A1* | 2/2016 | Shimbo | H04N 5/247 348/239 |
| 2019/0080477 A1* | 3/2019 | Fukui | H04N 5/2252 |
| 2019/0387178 A1 | 12/2019 | Ogata et al. | |
| 2019/0387180 A1 | 12/2019 | Ogata et al. | |

* cited by examiner

SURVEILLANCE CAMERA SYSTEM AND SURVEILLANCE CAMERA SETTING METHOD

CROSS-REFERENCE TO RELATED APPLICATIONS

This application is based on and claims priority under 35 USC 119 from Japanese Patent Application No. 2020-117978 filed on Jul. 8, 2020, the contents of which are incorporated herein by reference.

TECHNICAL FIELD

The present disclosure relates to a surveillance camera system and a surveillance camera setting method.

BACKGROUND ART

Patent Literature 1 discloses a domed surveillance camera that includes a plurality of cameras and a connector to and from which a wireless adapter is attached and detached. The surveillance camera wirelessly transmits video data of videos captured by the plurality of cameras to a mobile terminal via the wireless adapter attached to the connector. A user adjusts the plurality of cameras while viewing the videos that are captured by the plurality of cameras and are displayed on a display of the mobile terminal.

CITATION LIST

Patent Literature

Patent Literature 1: JP-A-2019-220831

SUMMARY OF INVENTION

In Patent Literature 1, since an adjustment is performed by a manual operation of the user, image capturing ranges of the cameras may overlap one another or a blind spot may occur in the image capturing ranges of respective cameras, and surveillance accuracy may be lowered. Further, it is difficult for the user to manually adjust the cameras so as to eliminate such overlapping or a blind spot in the image capturing ranges, which is troublesome.

An object of the present disclosure is to provide a surveillance camera system and a surveillance camera setting method that enables a user to efficiently set a surveillance camera including a plurality of cameras and can improve surveillance accuracy of the surveillance camera.

The present disclosure provides a surveillance camera system including a surveillance camera having a plurality of cameras that are configured to capture images in a plurality of different image capturing ranges; and a terminal device that is configured to communicate with the surveillance camera. The terminal device is configured to transmit, to the surveillance camera, arrangement pattern information and image capturing range information of the plurality of cameras that are input by an operation of a user. The surveillance camera is configured to calculate camera parameters of the plurality of cameras based on the arrangement pattern information and the image capturing range information of the plurality of cameras that are transmitted from the terminal device, respectively set the plurality of cameras based on the camera parameters, and transmit, to the terminal device, images respectively captured by the plurality of cameras after the setting. The terminal device is configured to display the images captured by the plurality of cameras and transmitted from the surveillance camera.

Further, the present disclosure provides a surveillance camera setting method in which a terminal device and a surveillance camera including a plurality of cameras configured to capture images in a plurality of different image capturing ranges are configured to communicate with each other. The surveillance camera setting method includes calculating camera parameters of the plurality of cameras based on arrangement pattern information and image capturing range information of the plurality of cameras that are input by an operation of a user; respectively setting the plurality of cameras based on the camera parameters; and displaying images captured by the plurality of cameras after the setting.

According to the present disclosure, a user can efficiently set a surveillance camera including a plurality of cameras, and surveillance accuracy of the surveillance camera can be improved.

DESCRIPTION OF EMBODIMENTS

Hereinafter, embodiments specifically disclosing configurations and operations of a surveillance camera system and a surveillance camera setting method according to the present disclosure will be described in detail with reference to the drawings as appropriate. However, unnecessarily detailed description may be omitted. For example, detailed description of a well-known matter or repeated description of substantially the same configuration may be omitted. This is to avoid unnecessary redundancy in the following description and to facilitate understanding for those skilled in the art. The accompanying drawings and the following description are provided for those skilled in the art to fully understand the present disclosure, and are not intended to limit the subject matter described in the claims.

Figure 1:
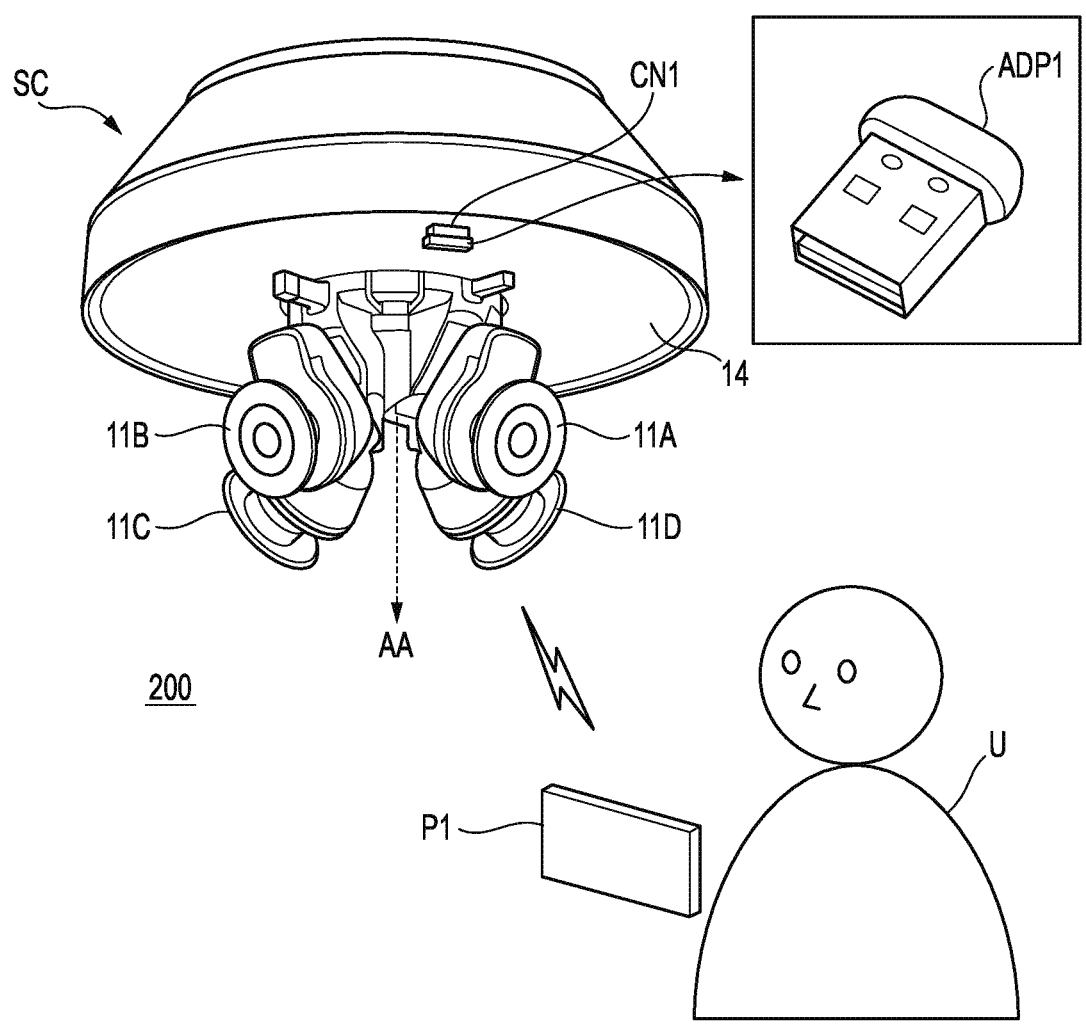
FIG. 1 is a view showing an example of an overall configuration of a surveillance camera system according to an embodiment.

FIG. 1 is a view showing a state of setting of a surveillance camera SC according to the embodiment. The surveillance camera SC includes four cameras 11A, 11B, 11C, and 11D. The surveillance camera SC sets each of the four cameras 11A to 11D based on an input operation of a user U received by a terminal device P1 that is connected to the surveillance camera SC so that the terminal device P1 can wirelessly communicate with surveillance camera SC. FIG. 1 shows an example in which the surveillance camera SC is installed on a ceiling or the like.

For example, the surveillance camera SC is installed on a pole of a traffic light installed at an intersection, a power pole, or is installed inside or outside a building, a commercial facility, or the like. The surveillance camera SC captures a surveillance region (image capturing range) set by the user U. The surveillance camera SC transmits, via a network NW1, video data captured by a plurality of cameras to the terminal device P1 operated by the user U. The surveillance camera SC includes the four cameras 11A to 11D, a wireless adapter ADP10, and a connector CN1. In the surveillance camera SC shown in FIG. 1, a cover 2 (see FIG. 4) that covers and protects the four cameras 11A to 11D is omitted. The cover 2 is attached by the user U after the surveillance camera SC is set.

Each of the four cameras 11A to 11D is movably fixed (coupled) to a plate-shaped base 14. An arrangement (that is, an image capturing layout) and an installation angle of each of the four cameras 11A to 11D are manually adjusted by the user U around an axis AA.

The base 14 is located immediately below a zenith (right below the zenith) of the cover 2 (see FIG. 3), and has a circular shape when viewed from a lower surface (+Z axis direction shown in FIGS. 5 and 6) of the surveillance camera SC. The base 14 includes the connector CN1. The connector CN1 is, for example, a universal serial bus (USB) connector.

The wireless adapter ADP1 includes, for example, a USB connector. The wireless adapter ADP1 is attached to the connector CN1, and is electrically connected to the surveillance camera SC. The wireless adapter ADP1 functions as a communication unit 20 (see FIG. 2) of the surveillance camera SC by electrically connecting the wireless adapter ADP1 to the surveillance camera SC. The wireless adapter ADP 1 connects the surveillance camera SC and the terminal device P1 so that the surveillance camera SC and the terminal device P1 can wirelessly communicate with each other, and thus data can be transmitted and received between the surveillance camera SC and the terminal device P1. Wireless communication is, for example, short-range wireless communication such as Bluetooth (registered trademark) and NFC (registered trademark), or communication via a wireless local area network (LAN) such as Wi-Fi (registered trademark).

The wireless adapter ADP1 may be removed from the connector CN1 after the user U finished setting the surveillance camera SC (that is, the four cameras 11A to 11D). Accordingly, since video data captured by the surveillance camera SC cannot be acquired by another terminal device via wireless communication, unauthorized reception via wireless communication of a third party can be prevented. That is, security of the surveillance camera can be improved.

The terminal device P1 can receive an input operation from the user U. The terminal device P1 is implemented by a personal computer (PC), a notebook PC, a tablet terminal, a smartphone, or the like. The terminal device P1 is connected to the surveillance camera SC so that the terminal device P1 can wirelessly communicate with the surveillance camera SC. The terminal device P1 converts an input operation of the user U into an electric signal and transmits the electric signal to the surveillance camera SC. The terminal device P1 receives the video data captured by the surveillance camera SC (that is, the four cameras 11A to 11D) after the surveillance camera SC is set, and displays the captured video data on a monitor (not shown).

The user U is an installer who installs the surveillance camera SC, a maintainer who inspects the surveillance camera SC, or the like. The user U operates the terminal device P1 or adjusts an arrangement or an installation angle of each of the four cameras 11A to 11D provided in the surveillance camera SC to set the surveillance camera SC so that the surveillance camera SC can monitor a surveillance region.

Figure 2:
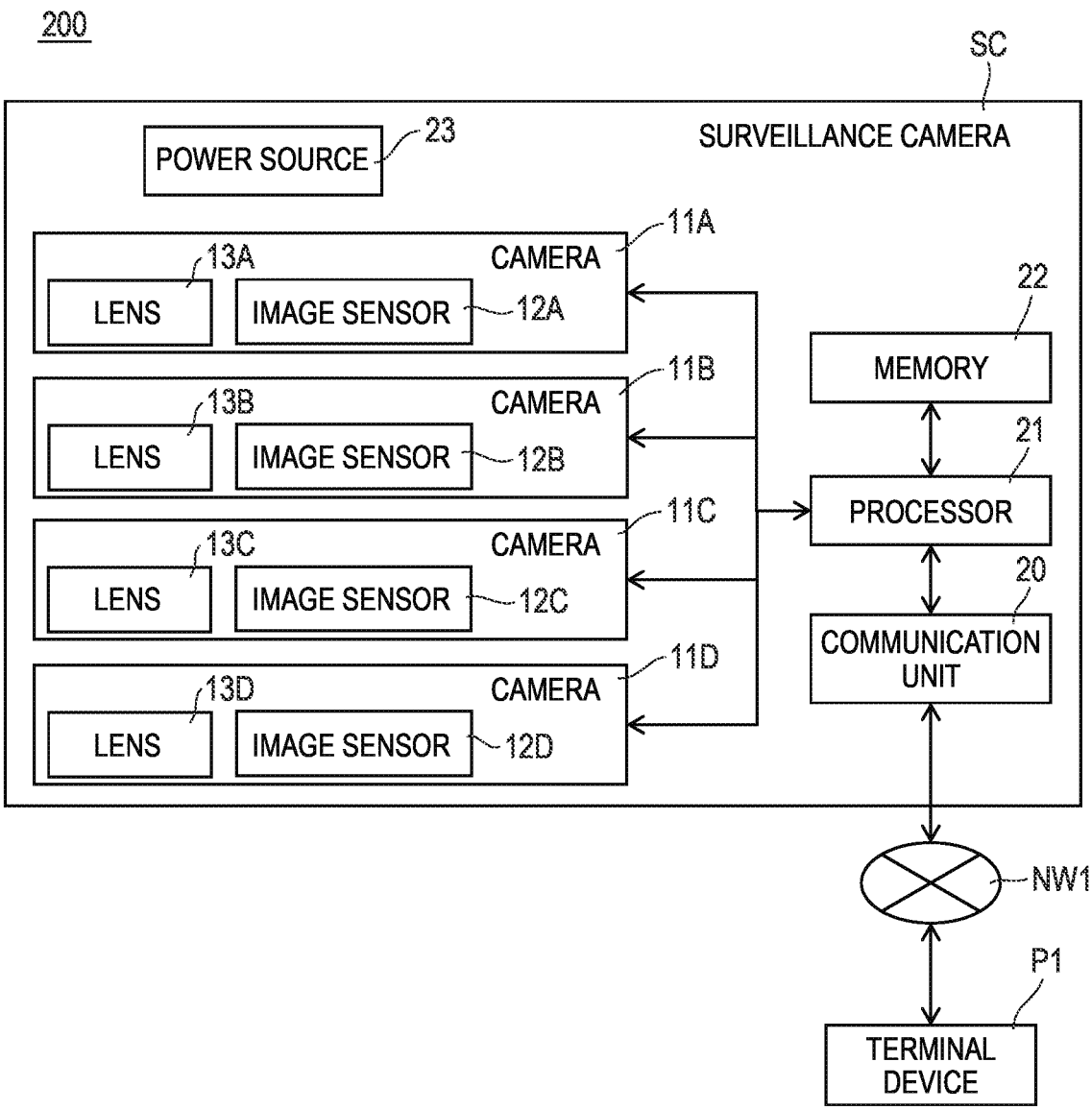
FIG. 2 is a view showing an example of an internal configuration of the surveillance camera according to the embodiment.

Next, an internal configuration of the surveillance camera SC will be described with reference to FIG. 2. FIG. 2 is a view showing an example of an internal configuration of the surveillance camera SC according to the first embodiment. The example of the internal configuration of the surveillance camera SC shown in FIG. 2 is an internal configuration example when the surveillance camera SC is set by the user U, that is, when the wireless adapter ADP1 is attached to the connector CN1.

The surveillance camera SC includes the communication unit 20, a processor 21, a memory 22, the four cameras 11A to 11D, and a power source 23. Although each of the four cameras 11A to 11D shown in FIG. 2 is an example camera in which a zoom magnification is adjusted by a varifocal lens, a zoom magnification of captured video data transmitted to the outside serving as a surveillance video may be adjusted by performing a digital zoom processing.

The communication unit 20 is implemented by the wireless adapter ADP1 attached to the connector CN1, and connects the processor 21 of the surveillance camera SC and the terminal device P1 so that the processor 21 of the surveillance camera SC can wirelessly communicate with the terminal device P1. The communication unit 20 outputs, to the processor 21, an electric signal that is related to the setting of the surveillance camera SC and is transmitted from the terminal device P1. The communication unit 20 transmits the video data captured by the four cameras 11A to 11D to the terminal device P1.

The processor 21 is implemented by a central processing unit (CPU), a field programmable gate array (FPGA), or the like, and executes various processing and controls in cooperation with the memory 22. Specifically, the processor 21 achieves a function of each unit by referring to a program and data stored in the memory 22 and executing the program. Here, the function refers to a function of calculating a zoom magnification of each of the four cameras 11A to 11D, a function of adjusting a focus of each of the four cameras 11A to 11D, a function of transmitting video data captured by each of the four cameras 11A to 11D, or the like, based on information that is related to an image capturing layout and an image capturing range of the four cameras 11A to 11D and is included in the electric signal transmitted from the terminal device P1.

The processor 21 calculates the zoom magnification based on a pattern that is related to the image capturing layout and the image capturing range of the four cameras 11A to 11D and is transmitted from the terminal device P1. The processor 21 drives lenses 13A, 13B, 13C, and 13D to adjust the zoom magnification of each of the four cameras 11A to 11D based on the calculated zoom magnification. When a control command for changing the zoom magnification is transmitted from the terminal device P1 according to an operation of the user, the processor 21 adjusts the zoom magnification of each of the four cameras 11A to 11D based on the control command.

When each of the lenses 13A, 13B, 13C, and 13D is implemented by a varifocal lens, the processor 21 executes a focusing processing after adjusting the zoom magnification. When a control command for adjusting the focus is transmitted from the terminal device P1 according to an operation of the user, the processor 21 adjusts the focus of each of the four cameras 11A to 11D based on the control command.

The memory 22 includes, for example, a random access memory (RAM) serving as a work memory used when a processing of the processor 21 is executed, and a read only memory (ROM) that stores a program and data defining an operation of the processor 21. Data or information generated or acquired by the processor 21 is temporarily stored in the RAM. A program for defining an operation of the processor 21 is written in the ROM.

The power source 23 supplies power from an external commercial power source to the surveillance camera SC. The power source 23 may directly supply power from an external commercial power source. Alternatively, the power source 23 may include, for example, a battery that can store electric charge supplied from an external commercial power source, or may be detachable from the external commercial power source and can supply power to the surveillance camera SC even when the power source 23 is disconnected from the external commercial power source.

The four cameras 11A to 11D include at least image sensors 12A, 12B, 12C, and 12D and the lenses 13A, 13B, 13C, and 13D. Each of the image sensors 12A to 12D is, for example, a solid-state image capturing device such as a charge-coupled device (CCD) or a complementary metal oxide semiconductor (CMOS), and converts an optical image formed on an image capturing surface into an electric signal. Specifically, each of the lenses 13A to 13D is a varifocal lens or a zoom lens. An example in which the four cameras 11A to 11D includes varifocal lenses as the lenses 13A, 13B, 13C, and 13D will be described in the present embodiment. Each of the four cameras 11A to 11D captures a surveillance region of the surveillance camera SC, and outputs captured video data to the processor 21.

The power source 23 supplies power from an external commercial power source to the surveillance camera SC. The power source 23 may directly supply power from an external commercial power source. Alternatively, the power source 23 may include, for example, a battery that can store electric charge supplied from an external commercial power source, or may be detachable from the external commercial power source and can supply power to the surveillance camera SC even when the power source 23 is disconnected from the external commercial power source.

The terminal device P1 is, for example, a PC, a notebook PC, a tablet terminal, or the like, and receives an operation from the user. The terminal device P1 is connected to the surveillance camera SC via a network NW so that the terminal device P1 can wirelessly communicate with the surveillance camera SC. The terminal device P1 converts the received user operation into an electric signal, and transmits the electric signal to the surveillance camera SC. Here, the wireless communication is communication via a wireless LAN such as Wi-Fi (registered trademark). The terminal device P1 displays video data that is captured by the four cameras 11A to 11D and is transmitted from surveillance camera SC on a monitor (not shown).

The monitor (not shown) is implemented by a liquid crystal display (LCD), an organic electroluminescence (EL), or the like. The monitor displays videos that are captured by the four cameras 11A to 11D and are transmitted from surveillance camera SC. The monitor has a function of a user interface such as a touch panel. When an input operation from the user U is received, the monitor converts input content into an electric signal and outputs the electric signal to a processor (not shown) of the terminal device P1.

The network NW connects the surveillance camera SC and the terminal device P1 so that data can be communicated between the surveillance camera SC and the terminal device P1.

Figure 3:
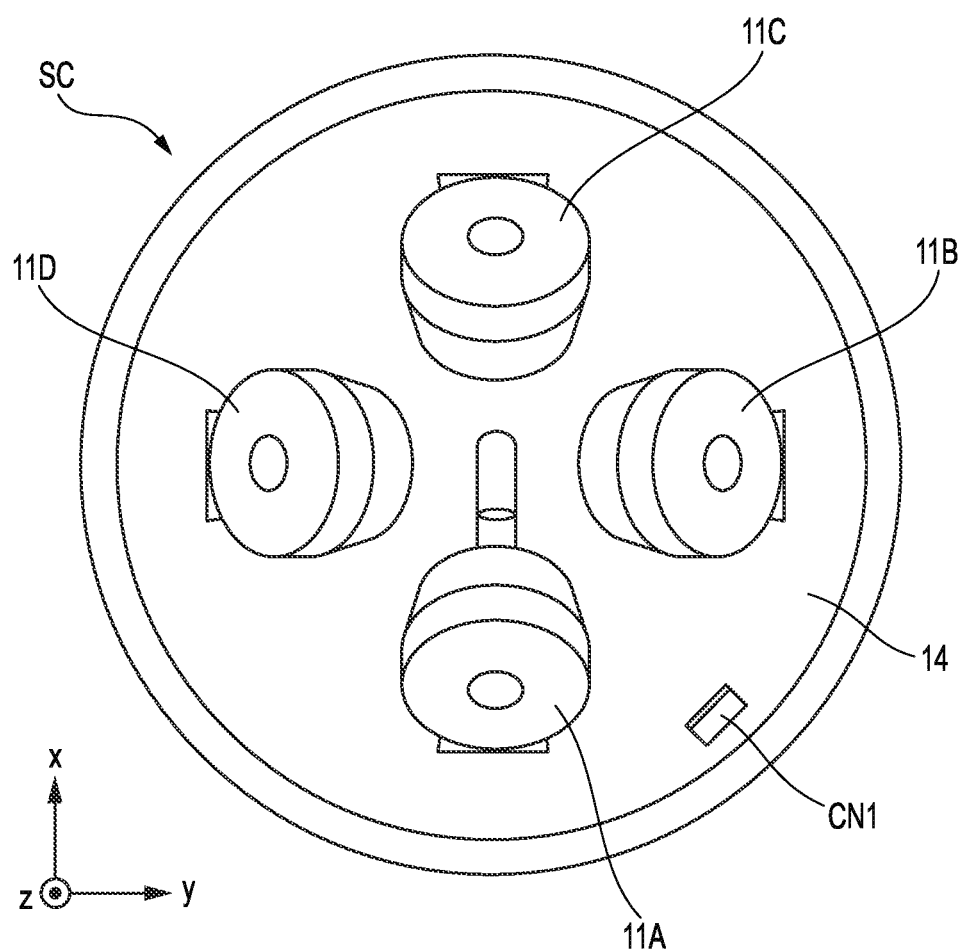
FIG. 3 is a view showing an example of a first image capturing layout of cameras.

FIG. 3 is a view showing an example of a first image capturing layout of the cameras 11A to 11D. As shown in FIG. 3, the first image capturing layout is a layout in which the four cameras 11A to 11D are arranged in a manner capable of capturing an image in front, rear, left, and right directions of the surveillance camera SC when the surveillance camera is, for example, installed on a ceiling or the like of a building. In the first image capturing layout, the four cameras 11A to 11D are substantially arranged in a horizontal direction. When four cameras 11A to 11D are arranged as in the first image capturing layout shown in FIG. 3, the surveillance camera SC can capture an image in 360 degrees in a horizontal direction. The first image capturing layout shown in FIG. 3 may be referred to as, for example, "360 degrees image capturing arrangement".

Figure 6:
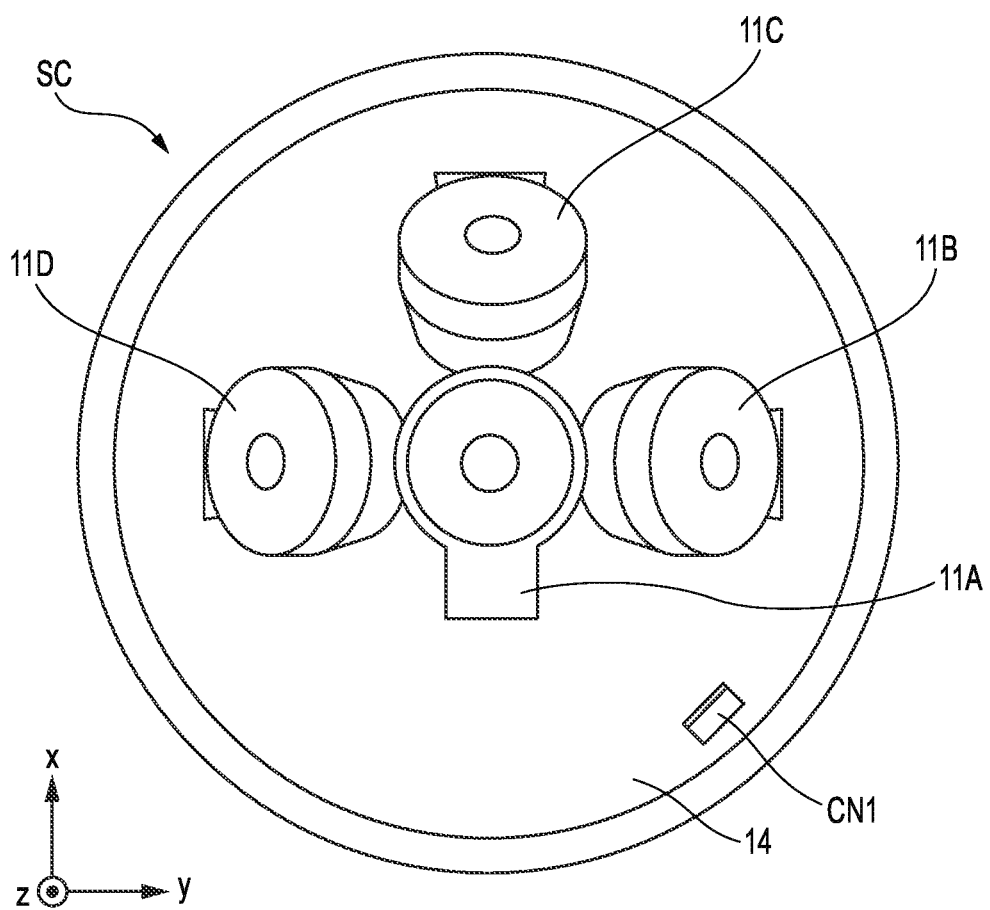
FIG. 6 is a view showing an example of a second image capturing layout of the cameras.

The arrangement of the four cameras 11A to 11D in a case in which the surveillance camera SC is installed on a ceiling is not limited to the first image capturing layout, and may be, for example, a second image capturing layout shown in FIG. 6.

Figure 4:
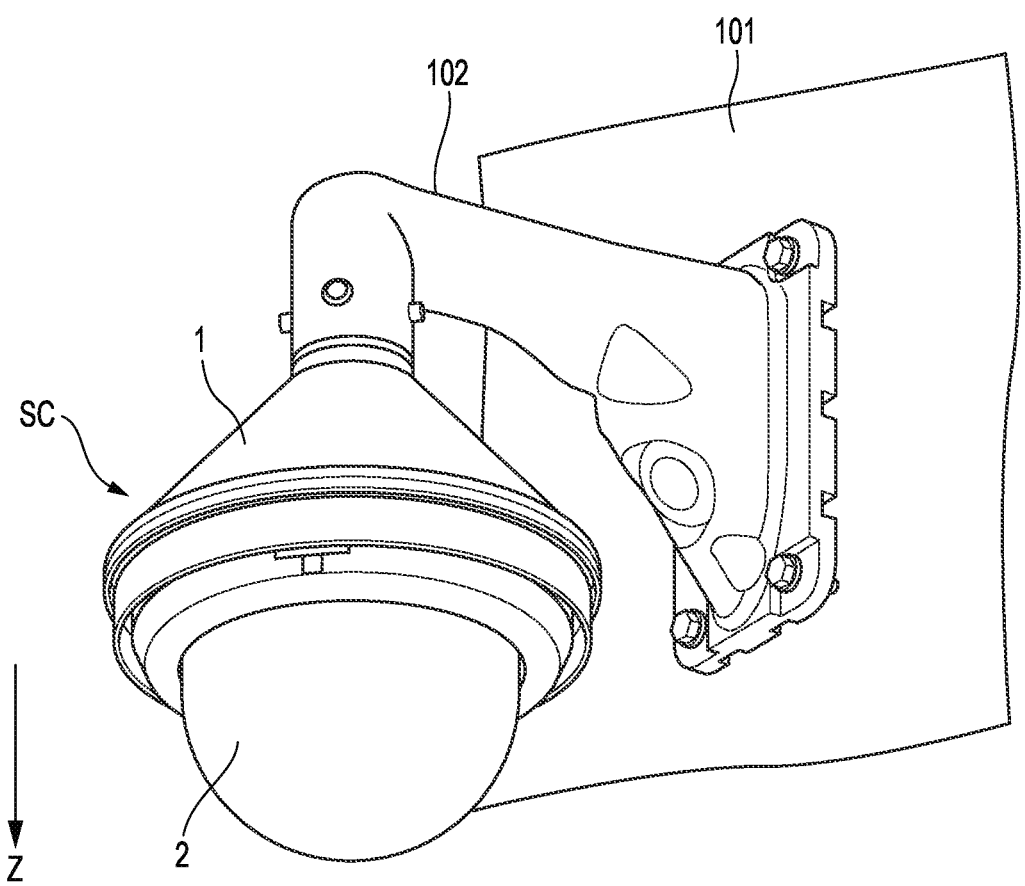
FIG. 4 is a view showing a state in which the surveillance camera is installed on a wall.

FIG. 4 is a view showing a state in which the surveillance camera SC is installed on a wall 101. The surveillance camera SC is fixed to and installed on the wall 101 by an attachment arm 102.

The wall 101 is, for example, an outer wall or an inner wall of a building. For example, the surveillance camera SC is installed by being attached to the wall 101 via the L-shaped attachment arm 102 shown in FIG. 4. The L-shaped attachment arm 102 shown in FIG. 4 is just an example, and the attachment arm 102 is not limited thereto.

At least one camera (for example, the camera 11A shown in FIG. 6) of the four cameras 11A to 11D provided in the surveillance camera SC is configured to be movable in a manner of facing a right below direction (+Z axis direction) of the surveillance camera SC. The surveillance camera SC installed on the wall 101 is arranged in the second image capturing layout (see FIG. 6) in which the four cameras 11A to 11D can capture an image, for example, in a right below direction (+Z axis direction) of the surveillance camera SC and in front, left, and right directions of the wall 101. Accordingly, the surveillance camera SC can simultaneously capture an image in the right below direction of the surveillance camera SC and in the front, left, and right directions of the wall 101.

Figure 5:
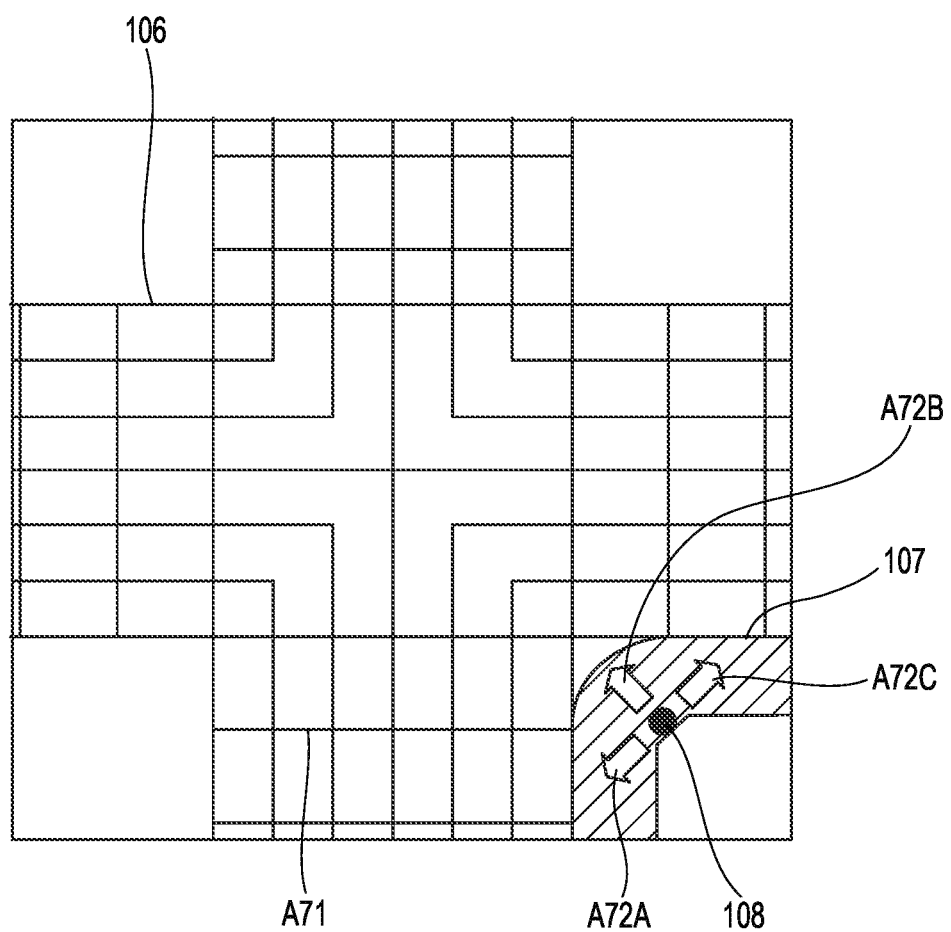
FIG. 5 is a view showing a state in which the surveillance camera is installed at an intersection.

FIG. 5 is a view showing a state in which the surveillance camera SC is installed at an intersection 106. Although the intersection 106 shown in FIG. 5 is a cross intersection, it is needlessly to say that the intersection where the surveillance camera SC is installed is not limited to a cross intersection. A hatched portion in FIG. 5 indicates a sidewalk 107.

In FIG. 5, the surveillance camera SC is installed on an outer wall (a position indicated by a black circle 108) of a building having a height at which the intersection 106 can be overlooked, and the surveillance camera SC captures an image of the intersection 106 and the sidewalk 107. In such a case, the four cameras 11A to 11D are arranged as in the second image capturing layout (see FIG. 6) in a similar manner to the surveillance camera SC installed on the wall 101 shown in FIG. 4.

An arrow A72A shown in FIG. 5 indicates an image capturing direction of the camera 11B of the surveillance camera SC shown in FIG. 6. An arrow A72B indicates an image capturing direction of the camera 11C of the surveillance camera SC shown in FIG. 6. An arrow A72C indicates an image capturing direction of the camera 11D of the surveillance camera SC shown in FIG. 6. Roads at the intersection 106 shown in FIG. 5 are indicated by grid-like lines A71 in an overlapping manner in order to represent far and near of a video captured by the surveillance camera SC.

FIG. 6 is a view showing an example of the second image capturing layout of the cameras 11A to 11D. As shown in FIG. 6, the second image capturing layout is a layout in which the four cameras 11A to 11D are arranged in a manner capable of capturing an image in a right below direction (+Z axis direction) of the surveillance camera SC and in front, left, and right directions when the surveillance camera SC is, for example, installed on a wall or the like of a building. In the second image capturing layout, three cameras of the four cameras 11A to 11S are substantially arranged in a horizontal direction, and the other camera is arranged in a manner of facing a lower side of the surveillance camera SC.

The surveillance camera SC has a structure in which at least one camera 11A of the four cameras 11A to 11D is movable so as to face a right below direction (+Z axis direction) of the surveillance camera SC. When the four cameras 11A to 11D are arranged as in the second image capturing layout shown in FIG. 6, the surveillance camera SC can capture an image in 270 degrees in the horizontal direction.

In the second image capturing layout, the surveillance camera SC can capture an image in a right below direction of the surveillance camera SC and can capture an image in front, left, and right directions of the wall. The second image capturing layout shown in FIG. 6 may be referred to as, for example, "270 degrees+right below image capturing arrangement".

Figure 7:
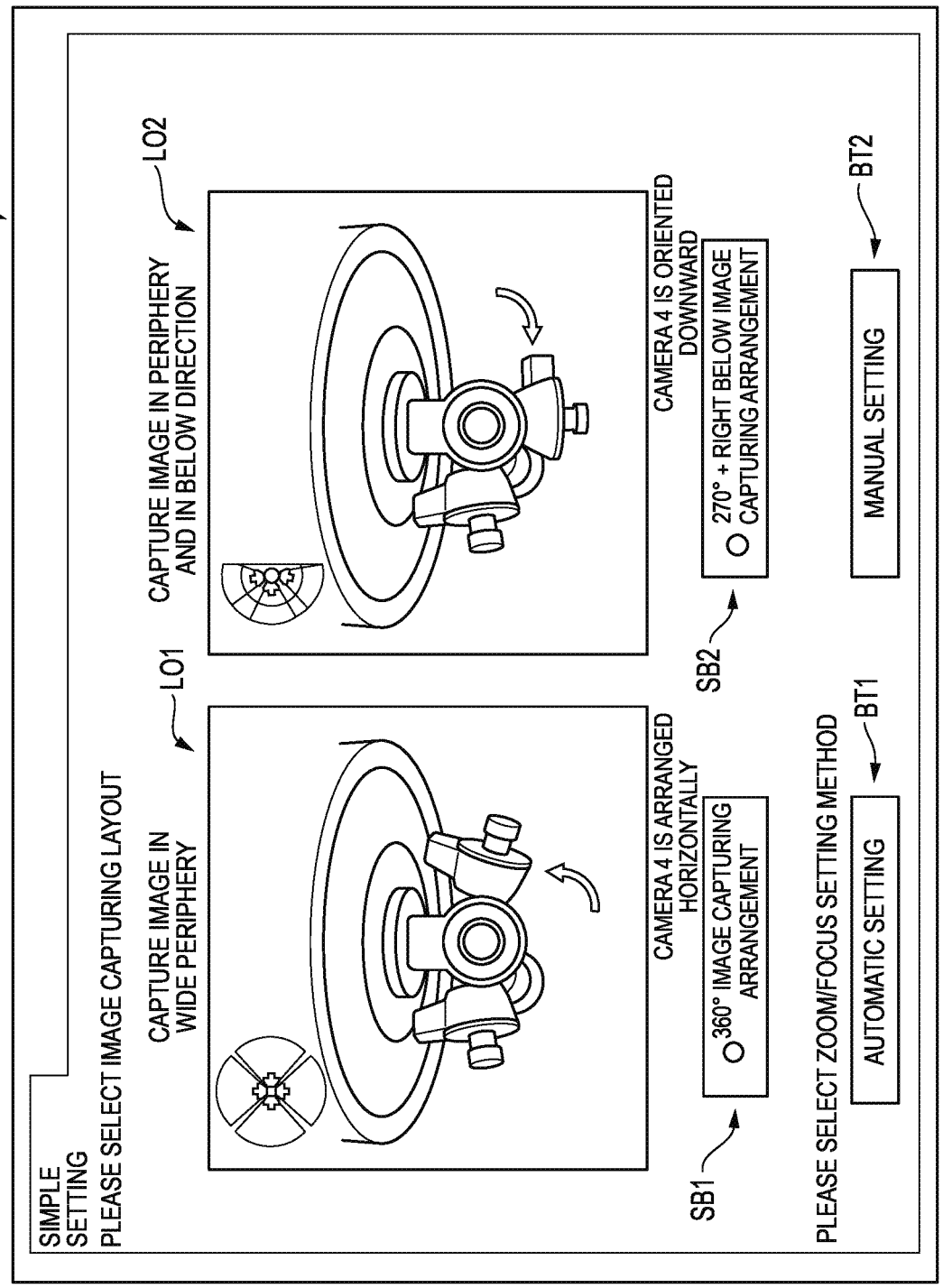
FIG. 7 is a view showing an example of an image capturing layout selection screen of the surveillance camera.

Next, a method of setting an image capturing layout of the surveillance camera SC will be described with reference to FIG. 7. FIG. 7 is a view showing an example of an image capturing layout selection screen MN1 of the surveillance camera SC. The image capturing layout selection screen MN1 is displayed on a monitor (not shown) provided in the terminal device P1. Each message displayed on the image capturing layout selection screen MN1 shown in FIG. 7 is just an example, and the present invention is not limited thereto.

The image capturing layout selection screen MN1 is a screen for receiving a selection of an arrangement of the four cameras 11A to 11D. The image capturing layout selection screen MN1 includes an image LO1 indicating an arrangement of the four cameras 11A to 11D in the first image capturing layout, an image LO2 indicating an arrangement of the four cameras 11A to 11D in the second image capturing layout, and selection buttons SB1 and SB2. Setting buttons BT1 and BT2 shown in FIG. 7 may not be included in the image capturing layout selection screen MN1.

The selection button SB1 is a button that is selected (pressed) when the user U wants to select the first image capturing layout in which all of the four cameras 11A to 11D are arranged horizontally (that is, one of the four cameras 11A to 11D is not arranged to face a lower direction (+Z axis direction) of the surveillance camera SC). The selection button SB1 is selectably displayed on the monitor together with a message of "360 degrees image capturing arrangement".

The selection button SB2 is a button that is selected (pressed) when the user U wants to select the second image capturing layout in which one of the four cameras 11A to 11D is arranged to face the lower direction (+Z axis direction) of the surveillance camera SC. The selection button SB2 is selectably displayed on the monitor together with a message of "270 degrees+right below image capturing arrangement".

The setting buttons BT1 and BT2 are buttons for receiving a selection as to whether the surveillance camera SC automatically sets a zoom or focus setting of each of the four cameras 11A to 11D or the user U manually sets the zoom or focus setting.

Figure 8:
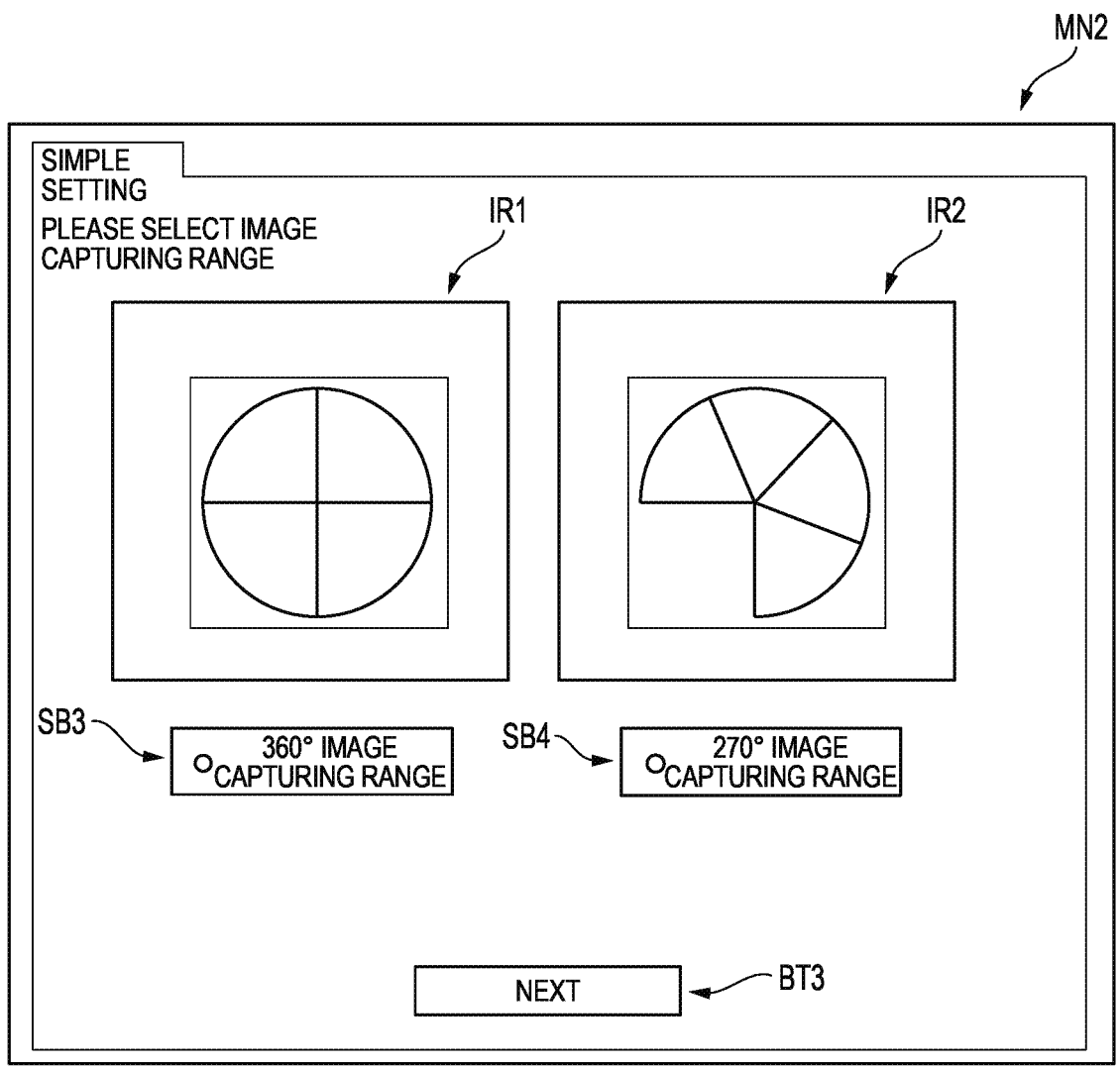
FIG. 8 is a view showing an example of an image capturing range selection screen of the surveillance camera in the first image capturing layout.

When the user U selects the setting button BT1 and the selection button SB1, the terminal device P1 displays an image capturing range selection screen MN2 shown in FIG. 8 on the monitor. On the other hand, when the user U selects the setting button BT1 and the selection button SB2, the terminal device P1 displays an image capturing range selection screen MN3 shown in FIG. 9 on the monitor.

When the user U selects the setting button BT2 and the selection button SB1, the terminal device P1 transmits the selected information to the surveillance camera SC. When the terminal device P1 receives captured video data from the surveillance camera SC, the terminal device P1 displays a surveillance screen MN5 shown in FIG. 11 on the monitor. On the other hand, when the user U selects the setting button BT2 and the selection button SB2, the terminal device P1 transmits the selected information to the surveillance camera SC. When the terminal device P1 receives captured video data from the surveillance camera SC, the terminal device P1 displays a surveillance screen MN6 shown in FIG. 12 on the monitor.

FIG. 8 is a view showing an example of the image capturing range selection screen MN2 of surveillance camera SC in the first image capturing layout. The image capturing range selection screen MN2 is displayed on the monitor (not shown) of the terminal device P1. Each message displayed on the image capturing range selection screen MN2 shown in FIG. 8 is an example, and the present invention is not limited thereto.

The image capturing range selection screen MN2 is a screen for receiving a selection of an image capturing range captured by the surveillance camera SC. The image capturing range selection screen MN2 includes an image IR1 indicating an image capturing range in a case in which the surveillance camera SC captures an image in an image capturing range of 360 degrees around an installation position of the surveillance camera SC, an image IR2 indicating an image capturing range in a case in which the surveillance camera SC captures an image in an image capturing range of 270 degrees around an installation position of the surveillance camera SC, selection buttons SB3 and SB4, and a button BT3.

The selection button SB3 is a button to be selected (pressed) when the user U wants to capture an image in 360 degrees around the surveillance camera SC, and can be selected together with a message of "capture an image in a range of 360 degrees".

The selection button SB4 is a button to be selected (pressed) when the user U wants to capture an image in 270 degrees around the surveillance camera SC, and can be selected together with a message of "capture an image in a range of 270 degrees". For example, the selection button SB4 is selected when there is an image capturing range in which it is unnecessary to capture a wall or the like or it is impossible to capture a wall or the like in an image capturing range in which the surveillance camera SC can capture an image in 360 degrees.

When the user selects (presses) the button BT3, the terminal device P1 transmits information about the currently selected image capturing layout and image capturing range to the surveillance camera SC via the network NW1.

Figure 9:
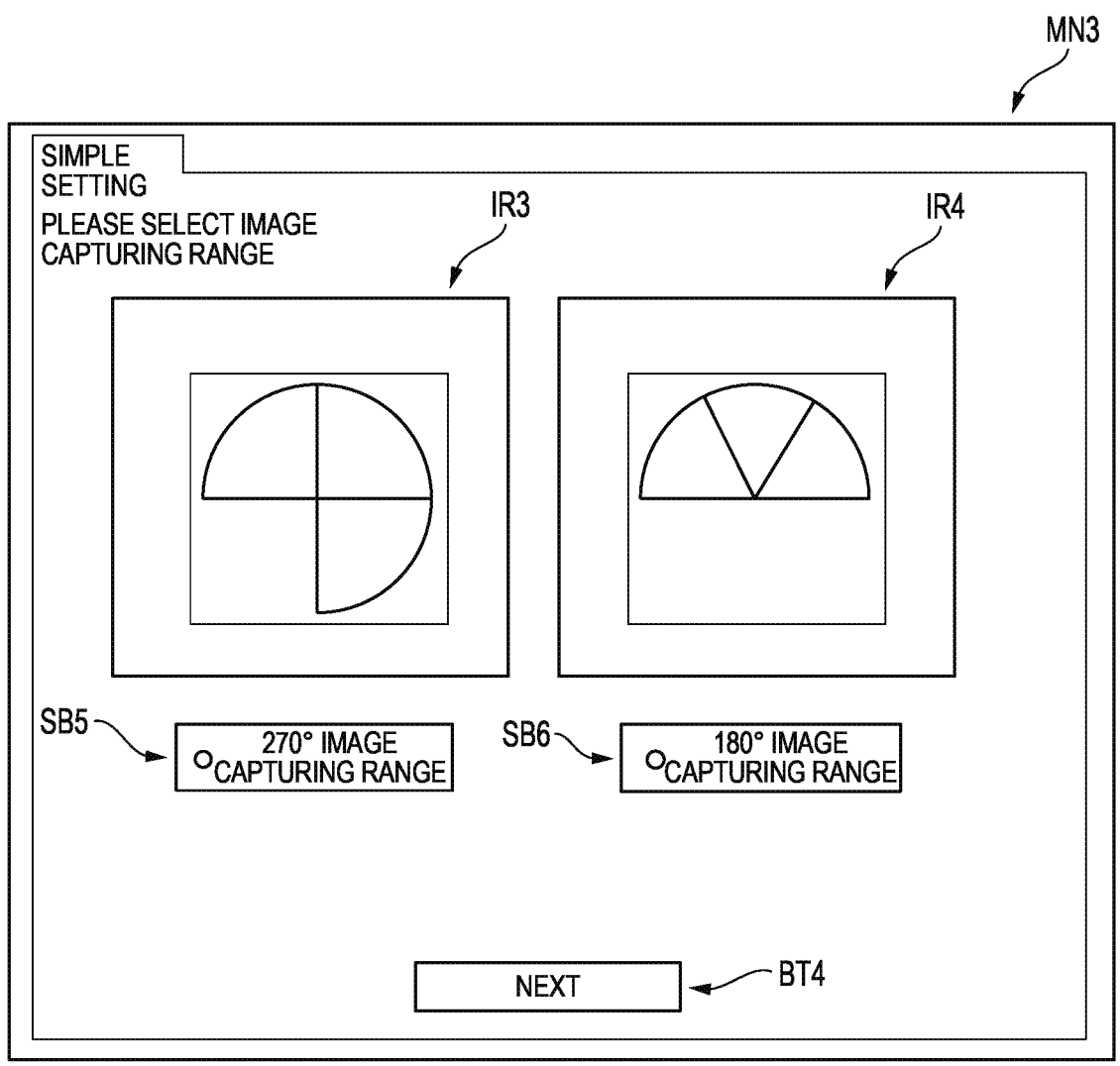
FIG. 9 is a view showing an example of an image capturing range selection screen of the surveillance camera in the second image capturing layout.

FIG. 9 is a view showing an example of the image capturing range selection screen MN3 of the surveillance camera SC in the second image capturing layout. The image capturing range selection screen MN3 is displayed on the monitor (not shown) of the terminal device P1. Each message displayed on the image capturing range selection screen MN3 shown in FIG. 9 is an example, and the present invention is not limited thereto.

The image capturing range selection screen MN3 is a screen for receiving a selection of an image capturing range captured by the surveillance camera SC. The image capturing range selection screen MN3 includes an image IR3 indicating an image capturing range in a case in which the surveillance camera SC captures an image in an image capturing range of 270 degrees around an installation position of the surveillance camera SC, an image IR4 indicating an image capturing range in a case in which the surveillance camera SC captures an image in an image capturing range of 180 degrees around an installation position of the surveillance camera SC, selection buttons SB5 and SB6, and a button BT4.

The selection button SB5 is a button to be selected (pressed) when the user U wants to capture an image in 270 degrees around the surveillance camera SC, and can be selected together with a message of "capture an image in a range of 270 degrees".

The selection button SB6 is a button to be selected (pressed) when the user U wants to capture an image in 180 degrees around the surveillance camera SC, and can be selected together with a message of "capture an image in a range of 180 degrees". For example, the selection button SB6 is selected when there is an image capturing range in which it is unnecessary to capture a wall or the like or it is impossible to capture a wall or the like in an image capturing range in which the surveillance camera SC can capture an image in 270 degrees.

When the user selects (presses) the button BT4, the terminal device P1 transmits information about the currently selected image capturing layout and image capturing range to the surveillance camera SC via the network NW1.

Figure 10:
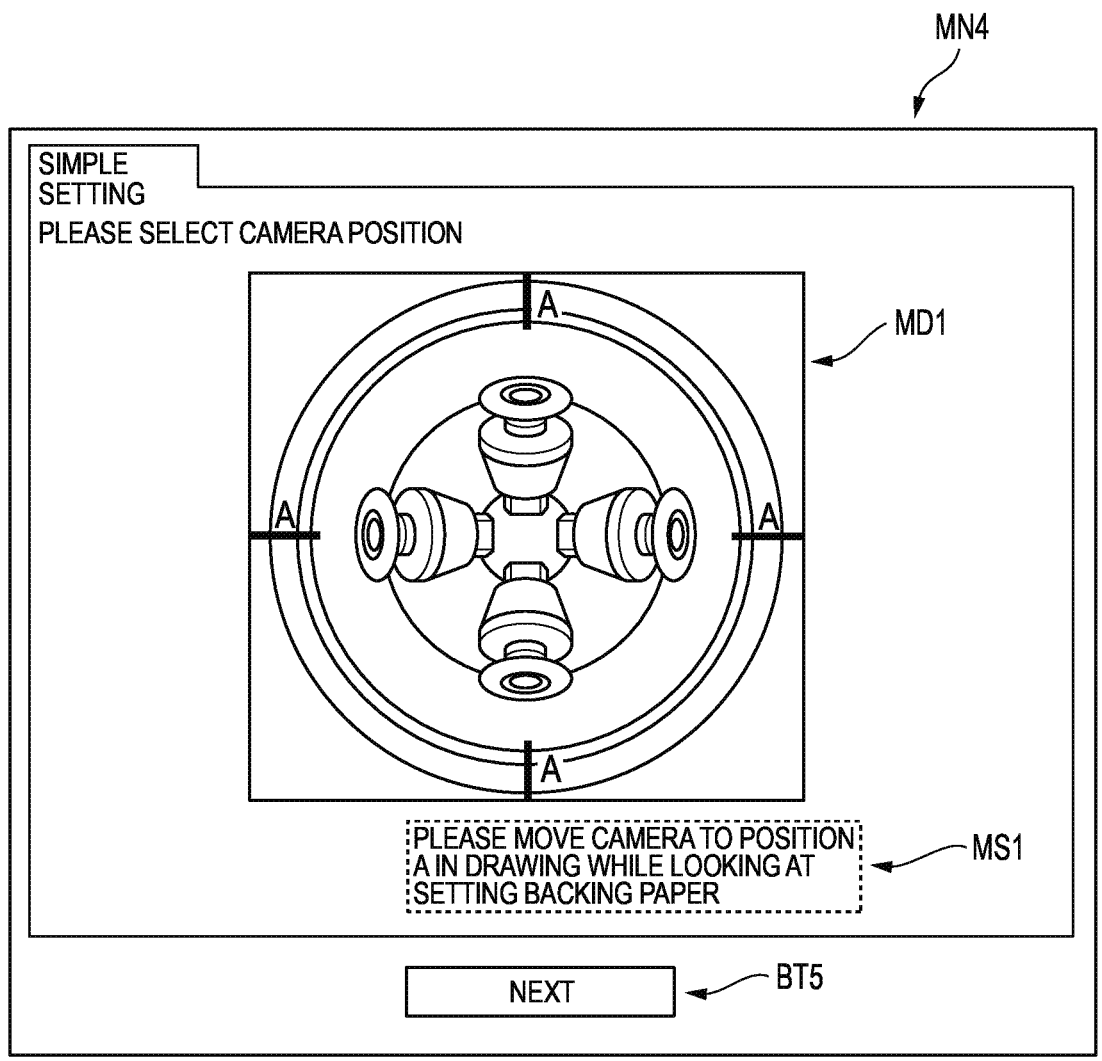
FIG. 10 is a view showing an example of a camera alignment screen.

FIG. 10 is a view showing an example of a camera alignment screen MN4. The camera alignment screen MN4 is a screen transmitted from the surveillance camera SC to the terminal device P1 based on the information about the currently selected image capturing layout and image capturing range, and is displayed on a monitor (not shown) of the terminal device P1. Each message displayed on the camera alignment screen MN4 shown in FIG. 10 is an example, and the present invention is not limited thereto.

The camera alignment screen MN4 is a screen for instructing the user U to adjust positions of the four cameras 11A to 11D to positions where the four cameras 11A to 11D can capture an image in the currently selected image capturing layout and image capturing range. The camera alignment screen MN4 includes an arrangement sample image MD1 and a button BT5.

The arrangement sample image MD1 is an image showing positions of the four cameras 11A to 11D at positions where the four cameras 11A to 11D can capture images in the currently selected image capturing range, and is displayed together with a message MS1 of "move the camera to a position A in the drawing while looking at a setting backing paper".

Here, the "setting backing paper" shown in the message MS1 is a backing paper that is sealed together with a construction instruction manual or a handling instruction manual of the surveillance camera SC and shows positions of the four cameras 11A to 11D corresponding to image capturing layouts and image capturing ranges. The user U can easily adjust selected image capturing ranges for the four cameras 11A to 11D so that the four cameras 11A to 11D can capture images by matching actual positions of the four cameras 11A to 11D with positions of the four cameras 11A to 11D shown on the "setting backing paper".

After the positions of the four cameras 11A to 11D are adjusted, the user U selects (presses) the button BT5. When the button BT5 is selected (pressed), the terminal device P1 generates a control command indicating that an adjustment (alignment) of the positions of the four cameras 11A to 11D is completed, and transmits the generated control command and information about the image capturing layout and the image capturing range that are selected by the user U to the surveillance camera SC via the network NW1.

Figure 11:
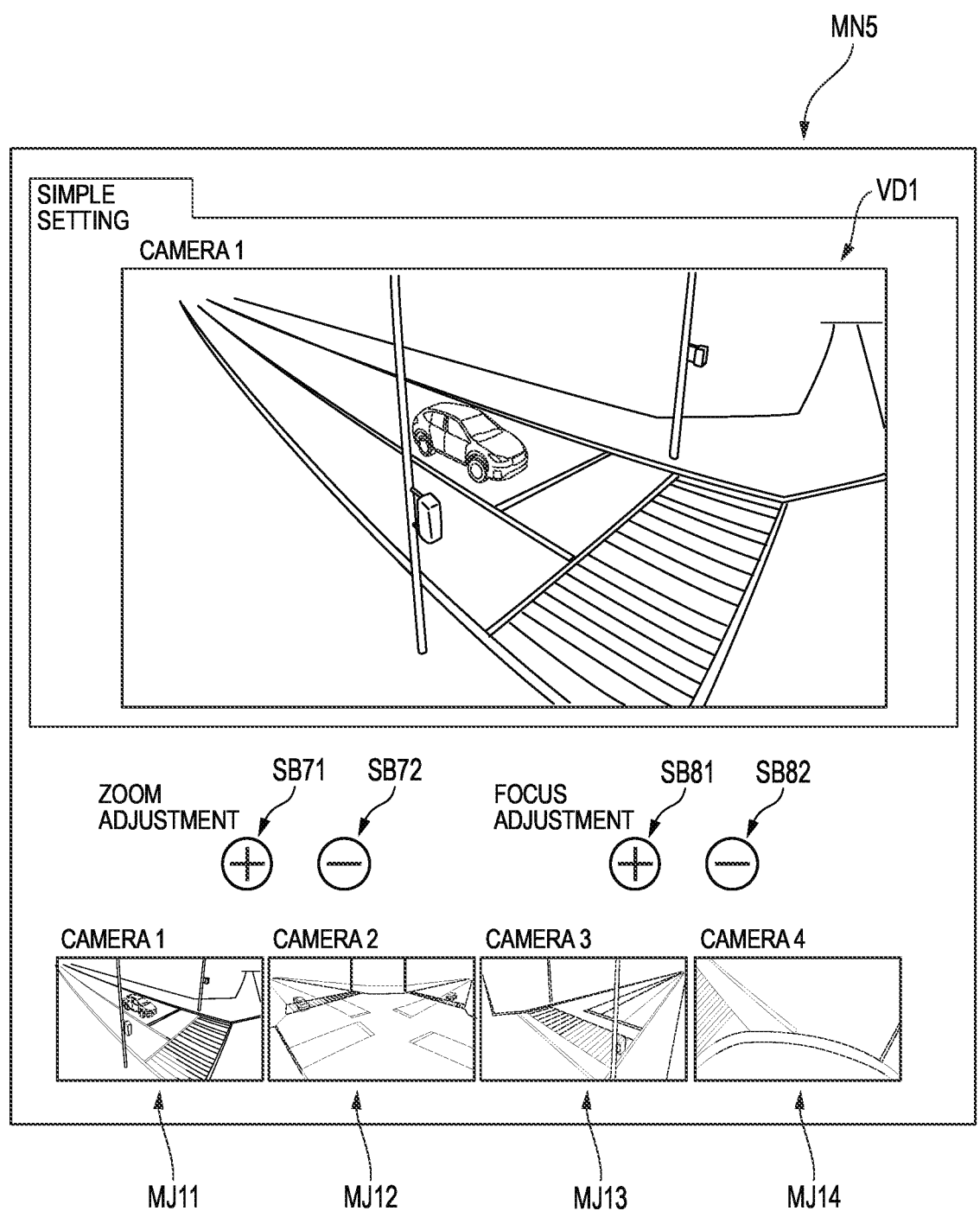
FIG. 11 is a view showing an example of a surveillance screen when an image is captured in the first image capturing layout.

FIG. 11 is a view showing an example of the surveillance screen MN5 in a case in which an image is captured in the first image capturing layout. When the terminal device P1 receives video data captured by the four cameras 11A to 11D from the surveillance camera SC, the terminal device P1 generates the surveillance screen MN5 and displays the surveillance screen MN5 on a monitor (not shown).

The surveillance screen MN5 is a screen displayed on the monitor of the terminal device P1 when the "360 degrees image capturing arrangement" (that is, the selection button SB1) that is the first image capturing layout is selected on the image capturing layout selection screen MN1. The surveillance screen MN5 includes a live video display region VD1, zoom adjustment buttons SB71 and SB72, focus adjustment buttons SB81 and SB82, and a plurality of video display regions MJ11, MJ12, MJ13, and MJ14.

Each of the plurality of video display regions MJ11 to MJ14 is a region where a captured image included in the video data captured by each of the four cameras 11A to 11D is displayed in a Motion-JPEG format. The plurality of video display regions MJ11 to MJ14 are arranged in a horizontal row corresponding to the first image capturing layout (that is, a horizontal arrangement of the four cameras 11A to 11D). The video display region MJ11 is a region where an image captured by the camera 11A denoted by a "camera 1" is displayed in a Motion-JPEG format. The video display region MJ12 is a region where an image captured by the camera 11B denoted by a "camera 2" is displayed in a Motion-JPEG format. The video display region MJ13 is a region where an image captured by the camera 11C denoted by a "camera 3" is displayed in a Motion-JPEG format. The video display region MJ14 is a region where an image captured by the camera 11D denoted by a "camera 4" is displayed in a Motion-JPEG format. In the present embodiment, the terminal device P1 simultaneously updates and displays captured images displayed in the plurality of video display regions MJ11 to MJ14, for example, at an interval of 5 seconds or 7 seconds.

Accordingly, the user U can check a plurality of captured videos that are arranged corresponding to an arrangement of the four cameras 11A to 11D. Therefore, the user U can easily know a positional deviation of each of the four cameras 11A to 11D, overlapping of image capturing ranges, a blind spot, or the like.

The live video display region VD1 is a display region larger than each of the four video display regions MJ11 to MJ14. When the user U selects (presses) one of the plurality of video display regions MJ11 to MJ14, a live video captured by any one of the cameras corresponding to the selected video display region is displayed.

Each of the zoom adjustment buttons SB71 and SB72 is a button that can receive an adjustment of a zoom of a camera by the user U. When the user U selects (presses) the zoom adjustment button SB71, the terminal device P1 generates a control command for increasing a zoom magnification and transmits the control command to the surveillance camera SC. When the user U selects (presses) the zoom adjustment button SB72, the terminal device P1 generates a control command for reducing a zoom magnification and transmits the control command to the surveillance camera SC. The surveillance camera SC adjusts a zoom magnification of any one of the cameras that captures the live video displayed in the live video display region VD1 based on the control command transmitted from terminal device P1.

Each of the focus adjustment buttons SB81 and SB82 is a button that can receive an adjustment of a focus of a camera by the user U. When the user selects (presses) the focus adjustment button SB81, the terminal device P1 generates a control command for reducing a focal length of a lens and transmits the control command to the surveillance camera SC. When the user selects (presses) the focus adjustment button SB82, the terminal device P1 generates a control command for increasing a focal length of a lens and transmits the control command to the surveillance camera SC. The surveillance camera SC adjusts a focus (that is, a position of a lens) of any one of the four cameras that captures the live video displayed in the live video display region VD1 based on the control command transmitted from terminal device P1.

Figure 12:
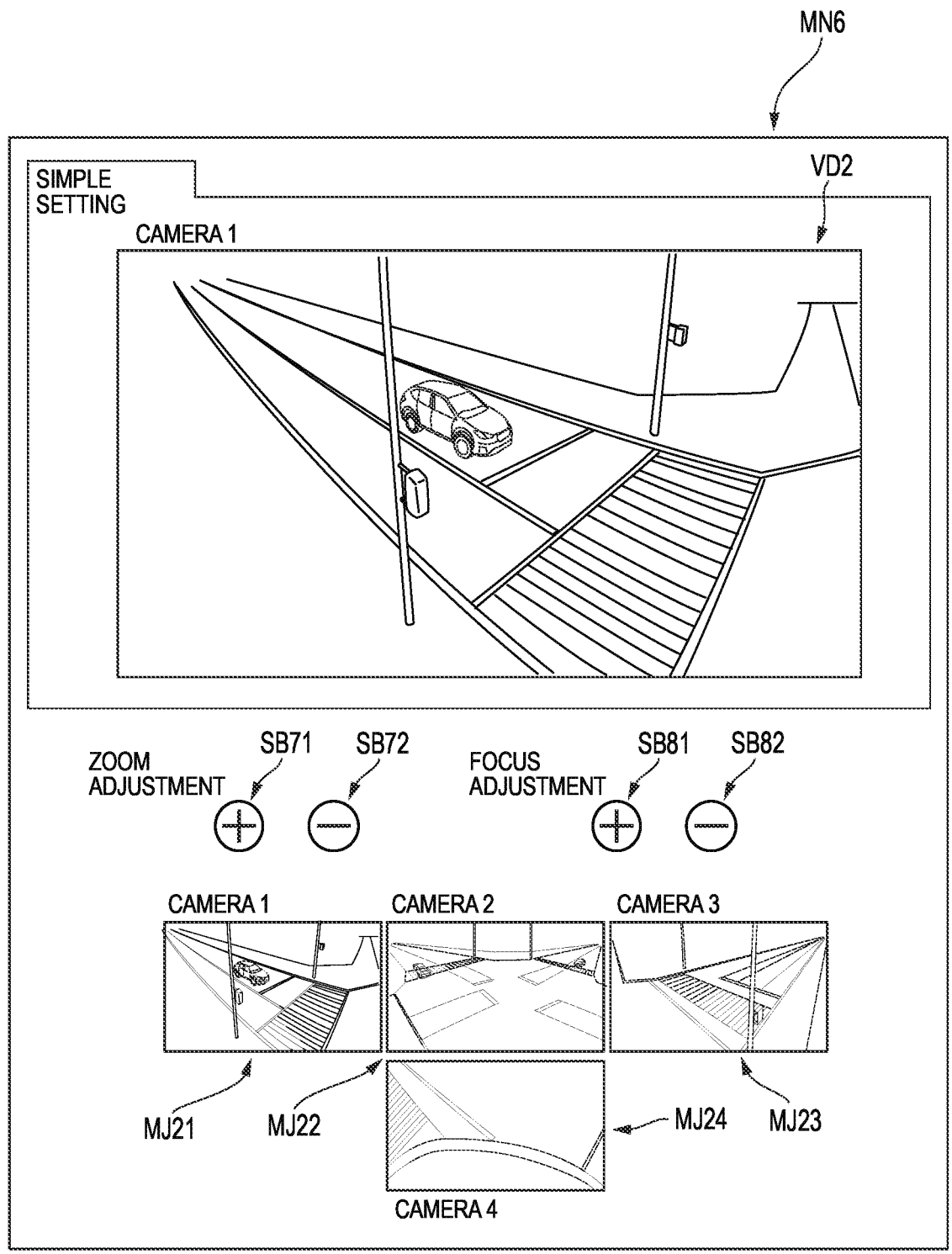
FIG. 12 is a view showing an example of a surveillance screen when an image is captured in the second image capturing layout.

FIG. 12 is a view showing an example of the surveillance screen MN6 in a case in which an image is captured in the second image capturing layout. When the terminal device P1 receives video data captured by the four cameras 11A to 11D from the surveillance camera SC, the terminal device P1 generates the surveillance screen MN6 and displays the surveillance screen MN6 on a monitor (not shown). Since the zoom adjustment buttons SB71 and SB72 and the focus adjustment buttons SB81 and SB82 shown in FIG. 12 are the same as the zoom adjustment buttons SB71 and SB72 and the focus adjustment buttons SB81 and SB82 shown on the surveillance screen MN5, description thereof will be omitted.

The surveillance screen MN6 is a screen displayed on the monitor of the terminal device P1 when the "270 degrees+ right below image capturing arrangement" (that is, the selection button SB2) that is the second image capturing layout is selected on the image capturing layout selection screen MN1. The surveillance screen MN6 includes a live video display region VD2, zoom adjustment buttons SB71 and SB72, focus adjustment buttons SB81 and SB82, and a plurality of video display regions MJ21, MJ22, MJ23, and MJ24.

Each of the plurality of video display regions MJ21 to MJ24 is a region where a captured image included in the video data captured by each of the four cameras 11A to 11D is displayed in a Motion-JPEG format. Corresponding to the second image capturing layout (that is, three of the four cameras 11A to 11D are arranged horizontally, and the other camera is arranged in a manner of facing a lower side of the surveillance camera SC), three captured images corresponding to the three cameras that are arranged horizontally are arranged in a horizontal row, and one captured image corresponding to the camera that is arranged in a manner of facing a lower side of the surveillance camera SC is arranged below the three captured images. An example in which the camera 11D denoted by a camera 4 is arranged in a manner of facing a lower side of the surveillance camera SC will be described in FIG. 12.

The video display region MJ21 is a region where an image captured by the camera 11A denoted by a "camera 1" is displayed in a Motion-JPEG format. The video display region MJ22 is a region where an image captured by the camera 11B denoted by a "camera 2" is displayed in a Motion-JPEG format. The video display region MJ23 is a region where an image captured by the camera 11C denoted by a "camera 3" is displayed in a Motion-JPEG format. The video display region MJ24 is a region where an image captured by the camera 11D denoted by a "camera 4" is displayed in a Motion-JPEG format. In the present embodiment, the terminal device P1 simultaneously updates and displays captured images displayed in the plurality of video display regions MJ21 to MJ24, for example, at an interval of 5 seconds or 7 seconds.

Accordingly, the user U can check a plurality of captured videos that are arranged corresponding to the arrangement of the four cameras 11A to 11D. Therefore, the user U can easily know a positional deviation of each of the four cameras 11A to 11D, overlapping of image capturing ranges, a blind spot, or the like.

The live video display region VD2 is a display region larger than each of the four video display regions MJ21 to MJ24. When the user U selects (presses) one of the plurality of video display regions MJ21 to MJ24, a live video captured by any one of the cameras corresponding to the selected video display region is displayed.

Figure 13:
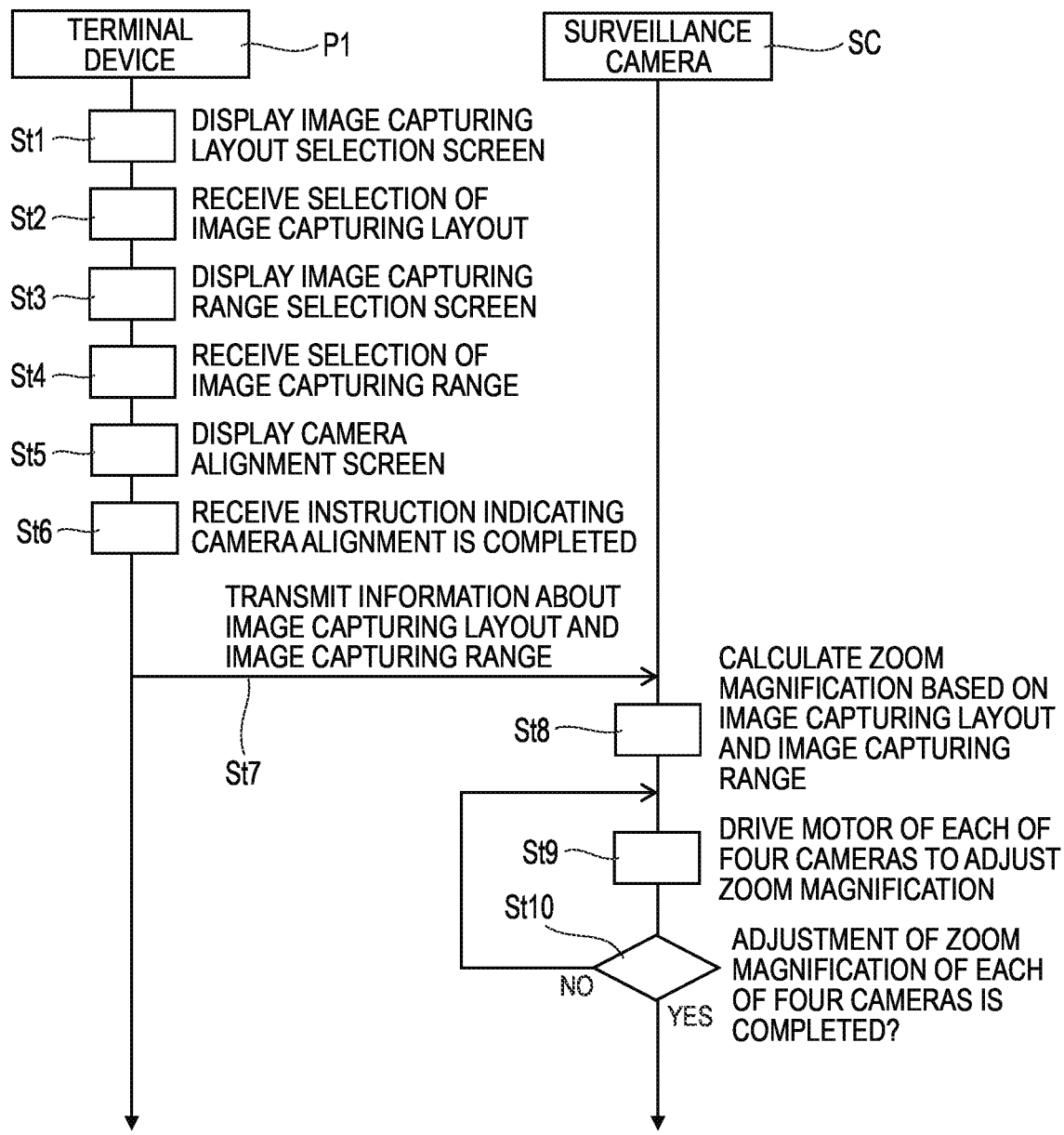
FIG. 13 is a sequence diagram showing an example of an operation procedure of the surveillance camera system according to the embodiment.
Figure 14:
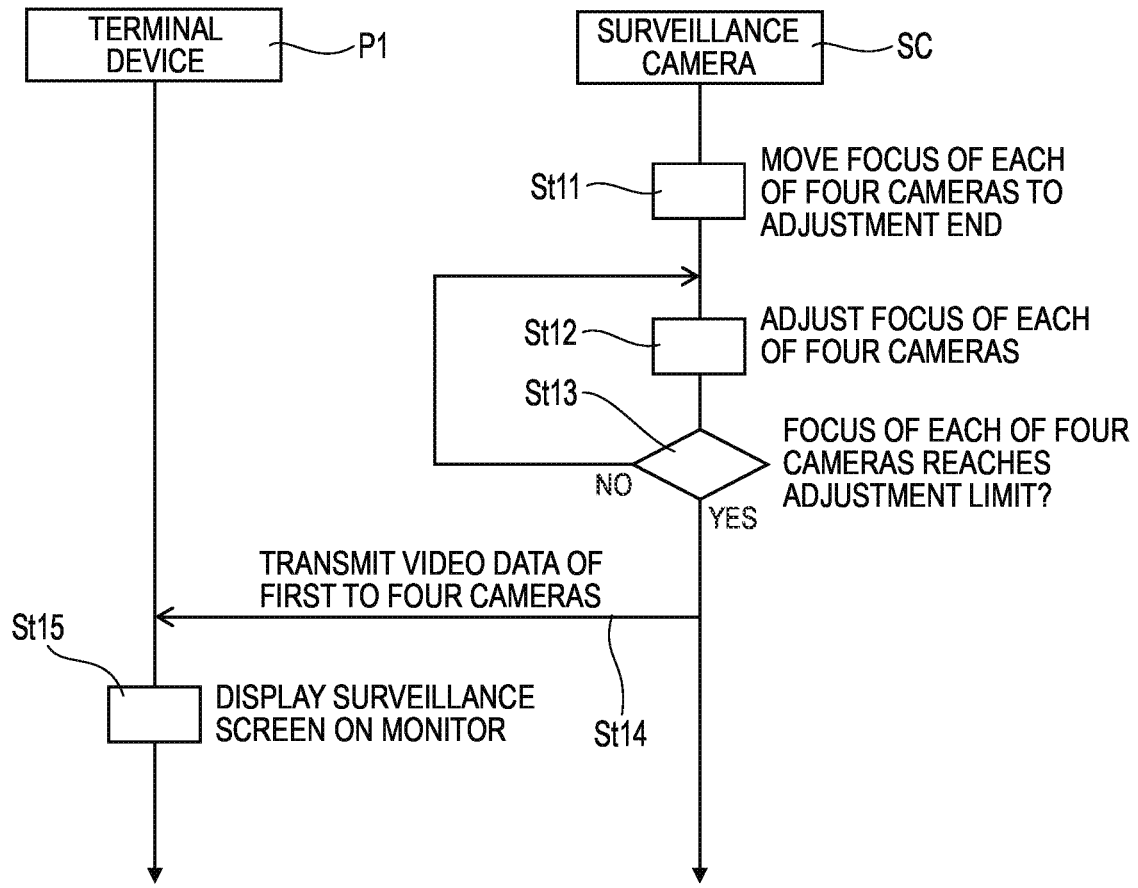
FIG. 14 is a sequence diagram showing an example of an operation procedure of the surveillance camera system according to the embodiment.

Next, an example of an operation procedure of a surveillance camera system 200 according to the present embodiment will be described with reference to FIGS. 13 and 14. FIG. 13 is a sequence diagram showing an example of an operation procedure of the surveillance camera system 200 according to the embodiment. FIG. 14 is a sequence diagram showing an example of an operation procedure of the surveillance camera system 200 according to the embodiment.

First, when an application for setting the surveillance camera SC is activated by the user U, the terminal device P1 displays the image capturing layout selection screen MN1 of the surveillance camera SC on the monitor (St1).

The terminal device P1 receives a selection of an image capturing layout of the four cameras 11A to 11D (that is, a selection of one of the selection buttons SB1 and SB2) from the user U (St2). When the setting button BT1 is selected after an image capturing layout is selected, the terminal device P1 displays the image capturing range selection screen MN2 or the image capturing range selection screen MN3 on the monitor based on the selected image capturing layout (St3). Specifically, when the user U selects the selection button SB1 (first image capturing layout), the terminal device P1 displays the image capturing range selection screen MN2, and when the user U selects the selection button SB2 (second image capturing layout), the terminal device P1 displays the image capturing range selection screen MN3.

The terminal device P1 receives a selection of an image capturing range of the surveillance camera SC from the user U (St4). Specifically, the terminal device P1 receives a selection of either the selection button SB3 (capture an image in 360 degrees) or the selection button SB4 (capture an image in 270 degrees) when the image capturing range selection screen MN2 is displayed, and receives a selection of either the selection button SB5 (capture an image in 270 degrees) or the selection button SB6 (capture an image in 180 degrees) when the image capturing range selection screen MN3 is displayed.

The terminal device P1 displays a camera alignment screen for aligning positions of the four cameras 11A to 11D based on the image capturing layout and the image capturing range that are selected by the user U (St5). Further, the terminal device P1 displays a message MS1 indicating an instruction to align positions of the four cameras 11A to 11D using the "setting backing paper" as a model with positions corresponding to the image capturing layout and the image capturing range that are selected by the user U.

When the terminal device P1 receives a selection of the button BT5 from the user U (St6), the terminal device P1 determines that alignment of the four cameras 11A to 11D by the user U is completed. The terminal device P1 generates a control command indicating that the alignment of the four cameras 11A to 11D is completed, and transmits the generated control command, and information about the image capturing layout and the image capturing range that are selected by the user U to the surveillance camera SC via the network NW1 (St7).

The surveillance camera SC calculates a zoom magnification of each of four cameras 11A to 11D based on the information about the image capturing layout and the image capturing range transmitted from terminal device P1 (St8). When the image capturing layout is the first image capturing layout and the image capturing range is 360 degrees, the surveillance camera SC calculates the zoom magnification to about 1.13 times. When the image capturing layout is the first image capturing layout and the image capturing range is 270 degrees, the surveillance camera SC calculates the zoom magnification to about 1.32 times. When the image capturing layout is the second image capturing layout and the image capturing range is 270 degrees, the surveillance camera SC calculates the zoom magnification to about 1.13 times. When the image capturing layout is the second image capturing layout and the image capturing range is 180 degrees, the surveillance camera SC calculates the zoom magnification to about 2.30 times.

Here, these zoom magnifications are calculated based on ranges (regions) in which respective image capturing ranges of the four cameras 11A to 11D overlap one another, and are magnifications at which respective image capturing ranges of the four cameras 11A to 11D do not overlap one another, respective image capturing ranges of the four cameras 11A to 11D are discontinuous, and a blind spot does not occur. These zoom magnifications described above are examples, and the present invention is not limited thereto. Accordingly, the surveillance camera SC can automatically adjust the respective image capturing ranges of the four cameras 11A to 11D so that the image capturing ranges of the four cameras 11A to 11D do not overlap one another.

The surveillance camera SC drives each motor of the four cameras 11A to 11D based on the calculated zoom magnification to adjust a zoom magnification (St9). The processing in step St9 is executed when the lenses 13A to 13D of the four cameras 11A to 11D are varifocal lenses, and is also executed when the lenses 13A to 13D are zoom lenses.

The surveillance camera SC determines whether the adjustment of the zoom magnification for each of the four cameras 11A to 11D is completed (St10).

When it is determined that the adjustment of the zoom magnification for each of the four cameras 11A to 11D is completed in the processing in step St10 (St10, YES), the surveillance camera SC moves a focus of each of the four cameras 11A to 11D to an adjustment end (that is, adjusts a focal length of each of the lenses 13A to 13D to a minimum value) (St11).

On the other hand, when it is determined that the adjustment of the zoom magnification for each of the four cameras 11A to 11D is not completed in the processing in step St10 (St10, NO), the surveillance camera SC returns to the processing in step St9 and readjusts the zoom magnification of each of the four cameras 11A to 11D. The surveillance camera SC may only readjust a zoom magnification for a camera for which the adjustment of the zoom magnification is not completed among the four cameras 11A to 11D.

The surveillance camera SC adjusts the focus of each of the four cameras 11A to 11D from the adjustment end (that is, the minimum value of the focal length of each of the lenses 13A to 13D) to a position where each of the four cameras 11A to 11D is in focus (St12).

The surveillance camera SC determines whether the focus of each of the four cameras 11A to 11D reaches an adjustment limit (that is, whether each of the four cameras 11A to 11D is adjusted to a most focused position) (St13).

When it is determined that the focus of each of the four cameras 11A to 11D reaches the adjustment limit (that is, the focus is adjusted to a most focused position) in the processing in step St13 (St13, YES), the surveillance camera SC transmits video data captured by each of the four cameras 11A to 11D to the terminal device P1 via the network NW1 (St14).

On the other hand, when it is determined that the focus of each of the four cameras 11A to 11D does not reach the adjustment limit (that is, the focus is not adjusted to the most focused position) in the processing in step St13 (St13, NO), the surveillance camera SC returns to the processing in step St12 and readjusts the focus of each of the four cameras 11A to 11D. The surveillance camera SC may readjust only a focus of a camera for which the focus adjustment is not completed among the four cameras 11A to 11D.

The processing in steps St11 to St13 described above may be omitted when the lenses 13A to 13D of the four cameras 11A to 11D are zoom lenses. In this case, the surveillance camera SC may proceed to the processing in step St14 after the processing in step St10.

The terminal device P1 displays a live video of any one of the four captured videos transmitted from the surveillance camera SC in the live video display region, converts each of the four captured videos into a Motion-JPEG format, generates the surveillance screen MN5 or the surveillance screen MN6 for displaying images captured by the four cameras 11A to 11D side by side in an arrangement corresponding to the image capturing layout selected by the user U, and displays the surveillance screen MN5 or the surveillance screen MN6 on the monitor (St15).

As described above, the surveillance camera system 200 according to the embodiment can improve the efficiency of the setting related to image capturing of the four cameras 11A to 11D of the surveillance camera SC performed by the user U. In addition, the surveillance camera system 200 displays the images captured by the four cameras 11A to 11D side by side in an arrangement corresponding to the image capturing layout selected by the user U, so that the surveillance camera system 200 can be supportive in that the user U can easily check whether respective image capturing ranges of the four cameras 11A to 11D overlap one another or whether there is a blind spot.

As described above, the surveillance camera system 200 according to the first embodiment is a system in which the terminal device P1 and the surveillance camera SC can communicate with each other and the surveillance camera SC includes a plurality of cameras 11A to 11D that can capture images in a plurality of different image capturing ranges. The terminal device P1 transmits, to the surveillance camera SC, image capturing layout information (an example of arrangement pattern information) and image capturing range (360 degrees or 270 degrees in the first image capturing layout, and 270 degrees or 180 degrees in the second image capturing layout) information of a plurality of cameras. The image capturing layout information and the image capturing range information are input by an operation of the user U. The surveillance camera SC calculates camera parameters (for example, a zoom magnification and the like) of the plurality of cameras 11A to 11D based on the image capturing layout information and image capturing range information of the plurality of cameras, respectively sets the plurality of cameras based on the camera parameters, and transmits images respectively captured by the plurality of cameras 11A to 11D after the setting to the terminal device P1. The terminal device P1 displays the images captured by the plurality of cameras 11A to 11D transmitted from the surveillance camera SC.

Accordingly, the surveillance camera system 200 according to the first embodiment can calculate the camera parameters (for example, a zoom magnification and the like) of the four cameras 11A to 11D based on the image capturing layout information and the image capturing range information of the four cameras 11A to 11D received by terminal device P1, and can automatically set the four cameras 11A to 11D. Therefore, the user U only inputs respective image capturing layouts and respective image capturing ranges at which the user U wants to capture images by the four cameras 11A to 11D, and then the surveillance camera system 200 automatically calculates the camera parameters and automatically sets the four cameras 11A to 11D. Therefore, the surveillance camera SC can be more efficiently set.

The camera parameters calculated by the surveillance camera system 200 according to the first embodiment are zoom magnifications at which the plurality of cameras 11A to 11D can capture images in different image capturing ranges. Accordingly, in the surveillance camera system 200 according to the first embodiment, the image capturing ranges of the four cameras 11A to 11D do not overlap one another. Therefore, the surveillance camera SC does not capture an image of an unnecessary surveillance region, and surveillance accuracy can be improved. The user U does not need to manually adjust a blind spot or overlapping ranges in the surveillance region of the surveillance camera SC by comparing the plurality of captured images displayed on the terminal device P1, and can efficiently set the surveillance camera SC.

The surveillance camera SC in the surveillance camera system 200 according to the first embodiment adjusts a focus of each of the plurality of cameras after adjusting a zoom magnification. As a result, in the surveillance camera system 200 according to the first embodiment, when the lenses 13A to 13D of the surveillance camera SC are varifocal lenses, it is possible to automatically adjust a deviation of the focus occurring after the zoom magnification adjustment. Therefore, the user U does not need to manually adjust the focus of each of the four cameras 11A to 11D, and can efficiently set the surveillance camera SC.

The terminal device P1 in the surveillance camera system 200 according to the first embodiment rearranges and displays the images captured by the cameras 11A to 11D in accordance with the image capturing layout information of the plurality of cameras 11A to 11D. Accordingly, the surveillance camera system 200 according to the first embodiment can arrange the four captured images displayed on the terminal device P1 corresponding to an actual arrangement of the four cameras 11A to 11D. Therefore, the user U can more intuitively check the surveillance region of the surveillance camera SC.

The surveillance camera SC in the surveillance camera system 200 according to the first embodiment includes the four cameras 11A to 11D. An image capturing layout of the four cameras 11A to 11D is either the first image capturing layout (an example of a first arrangement pattern) in which an image can be captured in 360 degrees in a horizontal direction of the surveillance camera or the second image capturing layout (an example of a second arrangement pattern) in which an image can be captured in 270 degrees in a horizontal direction of the surveillance camera and an image can be captured in a right below direction orthogonal to the horizontal direction. Accordingly, the surveillance camera system 200 according to the first embodiment can switch an arrangement of the four cameras 11A to 11D based on a request of the user U.

In the surveillance camera system 200 according to the first embodiment, the image capturing range information of the four cameras 11A to 11D in the first image capturing layout is either 360 degrees or 270 degrees in the horizontal direction of surveillance camera SC. Accordingly, the surveillance camera system 200 according to the first embodiment can easily switch the image capturing range of the four cameras 11A to 11D depending on an installation environment and a surveillance region of the surveillance camera SC.

In surveillance camera system 200 according to the first embodiment, the image capturing range information of the four cameras 11A to 11D in the second image capturing layout is either 270 degrees or 180 degrees in the horizontal direction of the surveillance camera. Accordingly, the surveillance camera system 200 according to the first embodiment can easily switch the image capturing range of the four cameras 11A to 11D depending on an installation environment and a surveillance region of the surveillance camera SC.

The terminal device P1 in the surveillance camera system 200 according to the first embodiment displays the camera alignment screen MN4 for instructing the user U to align the four cameras 11A to 11D based on the image capturing layout information and the image capturing range information of the plurality of cameras 11A to 11D, and the image capturing layout information and the image capturing range information are input by an operation of the user U. Accordingly, the surveillance camera system 200 according to the first embodiment displays the camera alignment screen MN4 on the terminal device P1 based on the image capturing layout selected by an operation of the user, so that the surveillance camera system 200 can be supportive when the user actually aligns the four cameras 11A to 11D.

Although various embodiments have been described with reference to the accompanying drawings, the present disclosure is not limited to examples in the embodiments. It will be apparent to those skilled in the art that various changes, modifications, substitutions, additions, deletions, and equivalents can be conceived within the scope of the claims, and it should be understood that these changes, modifications, substitutions, additions, deletions, and equivalents also belong to the technical scope of the present invention. Components in the embodiments described above may be combined optionally in a range without deviating from the spirit of the invention.

INDUSTRIAL APPLICABILITY

The present disclosure is useful in proposing a surveillance camera system and a surveillance camera setting method that enables a user to efficiently set a surveillance camera including a plurality of cameras and can improve surveillance accuracy of the surveillance camera.

What is claimed is:

1. A surveillance camera system comprising:
a surveillance camera including a plurality of cameras that are configured to capture images in a plurality of different image capturing ranges; and
a terminal device that is configured to communicate with the surveillance camera,
wherein the terminal device is configured to transmit, to the surveillance camera, arrangement pattern information and image capturing range information of the plurality of cameras that are input by an operation of a user,
wherein the surveillance camera is configured to
calculate camera parameters of the plurality of cameras based on the arrangement pattern information and the image capturing range information of the plurality of cameras that are transmitted from the terminal device,
respectively set the plurality of cameras based on the camera parameters, and
transmit, to the terminal device, images respectively captured by the plurality of cameras after the plurality of cameras is set based on the camera parameters,
wherein the terminal device is configured to display the images captured by the plurality of cameras and transmitted from the surveillance camera, and
wherein the camera parameters are zoom magnifications at which the plurality of cameras is configured to capture images in different image capturing ranges.

2. The surveillance camera system according to claim 1, wherein the surveillance camera adjusts focuses of the plurality of cameras after adjusting the zoom magnifications.

3. The surveillance camera system according to claim 1, wherein the terminal device rearranges and displays the images captured by the plurality of cameras in accordance with the arrangement pattern information of the plurality of cameras.

4. The surveillance camera system according to claim 1, wherein the surveillance camera includes four cameras, and
wherein the arrangement pattern information is either a first arrangement pattern in which the surveillance camera is configured to capture an image in 360 degrees in a horizontal direction of the surveillance camera or a second arrangement pattern in which the surveillance camera is configured to capture an image in 270 degrees in the horizontal direction of the surveillance camera and capture an image in a right below direction orthogonal to the horizontal direction.

5. The surveillance camera system according to claim 4, wherein the image capturing range information of the four cameras in the first arrangement pattern is either 360 degrees or 270 degrees in the horizontal direction of the surveillance camera.

6. The surveillance camera system according to claim 4, wherein the image capturing range information of the four cameras in the second arrangement pattern is either 270 degrees or 180 degrees in the horizontal direction of the surveillance camera.

7. The surveillance camera system according to claim 4, wherein the terminal device displays a screen for instructing alignment of the four cameras based on the arrangement pattern information and the image capturing range information of the plurality of cameras that are input by the operation of the user.

8. A surveillance camera setting method in which a terminal device and a surveillance camera including a plurality of cameras configured to capture images in a plurality of different image capturing ranges, are configured to communicate, the surveillance camera setting method comprising:
calculating camera parameters of the plurality of cameras based on arrangement pattern information and image capturing range information of the plurality of cameras that are input by an operation of a user;
respectively setting the plurality of cameras based on the camera parameters; and
displaying images captured by the plurality of cameras after the setting,
wherein the camera parameters are zoom magnifications at which the plurality of cameras is configured to capture images in different image capturing ranges.

* * * * *